US010767041B2

(12) United States Patent
Shih (10) Patent No.: US 10,767,041 B2
(45) Date of Patent: Sep. 8, 2020

(54) POLYMER COMPOSITIONS AND SUBSTRATES FOR HIGH TEMPERATURE TRANSPARENT CONDUCTIVE FILM APPLICATIONS

(71) Applicant: Eastman Chemical Company, Kingsport, TN (US)

(72) Inventor: Wayne Ken Shih, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 0 days.

(21) Appl. No.: 15/285,767

(22) Filed: Oct. 5, 2016

(65) Prior Publication Data

US 2017/0190903 A1 Jul. 6, 2017

Related U.S. Application Data

(60) Provisional application No. 62/259,088, filed on Nov. 24, 2015.

(51) Int. Cl.
*C08L 67/02* (2006.01)
*B29C 48/00* (2019.01)
*B29C 55/02* (2006.01)
*C08J 5/18* (2006.01)
(Continued)

(52) U.S. Cl.
CPC ............ *C08L 67/02* (2013.01); *B29C 48/001* (2019.02); *B29C 48/022* (2019.02); *B29C 55/02* (2013.01); *C08J 5/18* (2013.01); *B29K 2067/00* (2013.01); *B29L 2007/00* (2013.01); *C08J 2367/02* (2013.01); *C08J 2467/02* (2013.01); *C08L 2203/20* (2013.01); *C08L 2203/204* (2013.01); *C08L 2205/025* (2013.01)

(58) Field of Classification Search
CPC .. C08L 67/02; C08J 5/18; B29C 55/02; B29C 47/0038
USPC ......................................................... 428/220
See application file for complete search history.

(56) References Cited

U.S. PATENT DOCUMENTS

| | | | |
|---|---|---|---|
| 2,901,466 | A | 8/1959 | Kibler et al. |
| 3,284,223 | A | 11/1966 | Watson et al. |
| 3,907,754 | A | 9/1975 | Tershansy et al. |

(Continued)

FOREIGN PATENT DOCUMENTS

| | | |
|---|---|---|
| KR | 1020060132601 A | 12/2006 |
| KR | 1020150004576 A | 1/2015 |

(Continued)

OTHER PUBLICATIONS

ASTM D3418-15 "Standard Test Method for Transition Temperatures and Enthalpies of Fusion and Crystallization of Polymers by Differential Scanning Calorimetry"; Published Jun. 2015.

(Continued)

*Primary Examiner* — Tahseen Khan
(74) *Attorney, Agent, or Firm* — Robert C. Morriss (57) ABSTRACT

Described are polymer compositions that include a blend of copolyester polymers based on monomers that include on terephthalic acid (TPA), isophthalic acid (IPA) and 1,4-cyclohexanedimethanol (CHDM), wherein the blend includes a first copolyester that is semi-crystalline and a second copolyester that is amorphous; and films made from the polymer compositions useful for transparent high temperature conductive film applications.

19 Claims, 3 Drawing Sheets

Plot for sample determination of degree of crystallization (51) Int. Cl.
*B29K 67/00* (2006.01)
*B29L 7/00* (2006.01)

(56) References Cited

U.S. PATENT DOCUMENTS

| | | | |
|---|---|---|---|
| 3,962,189 | A | 6/1976 | Russin et al. |
| 4,010,145 | A | 3/1977 | Russin et al. |
| 4,356,299 | A | 10/1982 | Cholod et al. |
| 4,814,423 | A | 3/1989 | Huang et al. |
| 5,017,680 | A | 5/1991 | Sublett |
| 5,668,243 | A | 9/1997 | Yau et al. |
| 5,681,918 | A | 10/1997 | Adams et al. |
| 7,147,927 | B2 | 12/2006 | Pecorini et al. |
| 7,524,920 | B2 | 4/2009 | Pecorini et al. |
| 8,772,419 | B2 | 7/2014 | Jheng et al. |
| 2002/0161082 | A1 | 10/2002 | McWilliams et al. |
| 2004/0214984 | A1 | 10/2004 | Keep et al. |
| 2005/0026088 | A1 | 2/2005 | Greener et al. |
| 2006/0134409 | A1* | 6/2006 | Pecorini ............... C08J 5/18 428/355 R |
| 2006/0275558 | A1 | 12/2006 | Pecorini et al. |
| 2008/0260622 | A1* | 10/2008 | Graham ............... C09C 1/00 423/594.9 |
| 2010/0143699 | A1* | 6/2010 | Aoyama ............... B32B 27/36 428/319.7 |
| 2010/0159176 | A1* | 6/2010 | Hale ............... C08L 67/02 428/36.9 |
| 2011/0054091 | A1 | 3/2011 | Crawford et al. |
| 2012/0196979 | A1 | 8/2012 | Kliesch et al. |
| 2013/0150532 | A1 | 6/2013 | Jheng et al. |

FOREIGN PATENT DOCUMENTS

| | | | |
|---|---|---|---|
| WO | WO-9606125 A1 * | 2/1996 | ........... C08G 63/199 |
| WO | WO 9606125 A1 | 2/1996 | |
| WO | WO 2015/102339 A1 | 7/2015 | |

OTHER PUBLICATIONS

ASTM D1003 "Standard Test Method for Haze and Luminous Transmittance of Transparent Plastics"; Published Nov. 2013.

Gregory, D.R., Watson, M. T.; "Kinetics of the Thermal Degradation of Poly(1,4-cyclohexylenedimethylene terephthalate)"; Polymer Engineering and Science, Nov. 1972, vol. 12, No. 6, pp. 454-458.

ASTM D2857 "Standard Practice for Dilute Solution Viscosity of Polymers" Published Sep. 2016.

ASTM D4603 Standard Test Method for Determining Inherent Viscosity of Poly(Ethylene Terephthalate) (PET) by Glass Capillary Viscometer.

Notification of Transmittal of the International Search Report and the Written Opinion of the International Searching Authority, or the Declaration: International Application No. PCT/US2016/061225 with a filed of Nov. 10, 2016.

* cited by examiner

POLYMER COMPOSITIONS AND SUBSTRATES FOR HIGH TEMPERATURE TRANSPARENT CONDUCTIVE FILM APPLICATIONS

FIELD OF THE INVENTION

This invention generally pertains to polymer compositions and substrates for thermally-stable polyester films that can be coated with conductive coatings to produce a conductively coated substrate suitable for use in a variety of electronic applications including but not limited to liquid crystal displays, organic light emitting diodes, photovoltaic devices, RFID labels, and electrophoretic displays. More specifically, the invention pertains to thermally-stable polyester films produced from acid modified poly(1,4-cyclohexylenedimethylene terephthalate) (PCTA) copolyester, which is biaxially-oriented or stretched, heat-set, and then used to produce conductively coated substrates.

BACKGROUND OF THE INVENTION

Poly(ethylene terephthalate) (PET) films are widely used for a variety of wrapping, packaging, and lamination applications. In other applications such as flexible electronic circuits, touch screen displays, and flexible photovoltaic devices, biaxially-oriented and heat-set PET films having good dimensional stability and shrink resistance at elevated temperatures are used. However, biaxially-oriented PET films are not believed to be useful at temperatures exceeding 200° C. because of their low $T_g$ (~80° C.) and relatively low inherent melting temperature ($T_m$) (approximately 250° C.).

It is generally known in the art that biaxially-oriented PET has been used as substrate films for indium tin oxide (ITO) coated transparent conductive substrates. Although adequate for many applications, PET films are believed to lack temperature dimensional stability needed for the high temperature deposition of ITO often necessary to prepare a conductively coated substrate for use in applications where high transparency and high conductivity are desirable, such as in flat panel displays and photovoltaic devices. Higher temperatures are believed to be necessary to reduce the thickness of the ITO coating for a given conductivity. Reduced thickness coatings can resist fracture when bent, and there is a need in many existing and emerging applications for increased durability and flexible form factors while maintaining high transparency and adequate conductivity. These applications include flat panel displays, photovoltaic devices, and flexible displays among others. In addition, it has been reported that for high transparency/high conductivity films requiring a post-deposition annealing process, ITO coated films, where the deposition and annealing were done at greater than 200° C., resulted in conductive substrates with superior conductivity relative to films where the ITO was sputtered and annealed at temperatures less than 200° C.

Biaxially oriented PET has also been used as a substrate for ITO projected capacitive (PCAP) touch sensors for mobile devices such as smartphones and tablets. Personal computers (PC) with touch screens are also gaining popularity. However, ITO transparent conductive film requires heat annealing in order to achieve low enough sheet resistance for acceptable touch sensitivity. The annealing time is normally longer than an hour and the annealing temperature is below 150° C. to prevent deformation of the PET substrate and damage to sputtered ITO conductive layer. Longer and hotter annealing of PET will increase oligomer migration to the film surface and deteriorate the light transmittance of the transparent conductive film. A higher temperature substrate with less oligomer migration than PET is therefore desired. PEN has been suggested as a high temperature substrate. However, oligomer migration to the film surface is also a problem during film heat setting and ITO annealing processes. PCT has higher heat resistance, but crystallizes too fast on the chill drum in extrusion, which results in a brittle film that presents problems for subsequent machine direction and transverse direction stretching, and/or for end use requirements.

Desirable properties of a transparent conductively coated substrate include: transparency, conductivity, flexibility, charge carrier density, charge carrier mobility, tensile and flexural properties, hydrolytic stability, and dimensional stability. The current materials (PET, PEN, polyimide, glass, etc. . . . ) known in the art for use in transparent conductively coated substrates are believed to be deficient in one or more of the aforementioned properties. To achieve superior conductivity while maintaining transparency, flexibility, and substrate durability; a material with greater temperature dimensional stability than PET is needed; a material with improved thickness reduction and flexibility to glass is needed; and a material with improved transparency to polyimide is needed.

Certain applications, such as transparent conductively coated substrates, would benefit from or even require films that are heat stable (i.e., possessing good dimensional stability) at temperatures greater than or equal to 150° C. Specifically, the films should not blister or wrinkle when coated with ITO and/or other inorganic oxide at temperatures greater than 150° C.

Superior hydrolytic stability is another desirable property for films used as conductively coated substrates across a variety of applications. Therefore, base films with superior hydrolytic stability for producing conductively coated substrates, which tend to maintain their structural integrity under high temperature and high humidity conditions, are also needed.

SUMMARY OF THE INVENTION

It is believed that melt processable polymers according to the invention comprising a blend of semi-crystalline and amorphous polyester components based on terephthalic acid (TPA), isophthalic acid (IPA) and 1,4-cyclohexanedimethanol (CHDM), such as a blend of a semi-crystalline PCTA copolyester and an amorphous PCTA copolyester, provide a manufacturing advantage over PCT and PCTA polymers in the art for making transparent, high-temperature and dimensionally stable polyester films.

In one aspect, the invention is directed to polymer compositions comprising a blend of a first PCTA copolyester and a second PCTA copolyester, wherein:

the first PCTA copolyester comprises: (a) diacid residues comprising from about 90 to about 99 mole percent of TPA residues and from about 1 to about 10 mole percent IPA residues; and (b) diol residues comprising at least 85 mole percent of CHDM residues, wherein the first PCTA copolyester comprises a total of 100 mole percent diacid residues and a total of 100 mole percent diol residues;

the second PCTA copolyester comprises: (a) diacid residues comprising from about 60 to about 90 mole percent of TPA residues and from about 10 to about 40 mole percent IPA residues; and (b) diol residues comprising at least 85 mole percent of CHDM residues, wherein the second PCTA copolyester comprises a total of 100 mole percent diacid residues and a total of 100 mole percent diol residues;

wherein the first PCTA copolyester is semi-crystalline;

wherein the second PCTA copolyester is amorphous; and wherein the blend comprises diacid residues comprising from about 5 to about 20 net mole percent of IPA residues, wherein the blend comprises a total of 100 mole percent diacid residues and a total of 100 mole percent diol residues.

In embodiments of the invention, the first PCTA copolyester comprises diacid residues comprising from 3 to 7 mole percent IPA residues. In one embodiment, the first PCTA copolyester comprises diacid residues comprising about 5 mole percent IPA residues.

In embodiments of the invention, the first PCTA copolyester has a degree of crystallinity of about 40% or greater. In embodiments, the first PCTA copolyester has a degree of crystallinity from about 40% to about 50%.

In embodiments of the invention, the second PCTA copolyester comprises diacid residues comprising from 20 to 30 mole percent IPA residues. In one embodiment, the second PCTA copolyester comprises diacid residues comprising about 25 mole percent IPA residues.

In embodiments of the invention, the second PCTA copolyester has a degree of crystallinity of about 5% or less. In embodiments, the second PCTA copolyester has a degree of crystallinity of less than 1%. In embodiments of the invention, the second PCTA copolyester is capable of being crystallized by heating or stretching.

In one embodiment, the first PCTA copolyester and second PCTA copolyester comprise the same diacid monomer residues, albeit in different mole percentages. In embodiments, the first PCTA copolyester and second PCTA copolyester each comprise diacid residues of both TPA and IPA residues; and each comprise diol residues comprising at least 85 mole percent of CHDM residues, wherein each PCTA copolyester comprises a total of 100 mole percent diacid residues and a total of 100 mole percent diol residues.

In one embodiment, 100 mole percent of the diacid residues for the first PCTA polyester consists of TPA and IPA residues, and 100 mole percent of the diacid residues for the second PCTA polyester consists of TPA and IPA residues.

In one embodiment, the first PCTA copolyester and second PCTA copolyester each comprise diol residues that consist of 100 mole percent of CHDM residues.

In one embodiment, the blend comprises diacid residues comprising from about 7 to about 12 net mole percent of IPA residues, wherein the blend comprises a total of 100 mole percent diacid residues and a total of 100 mole percent diol residues.

In embodiments of the invention, the blend comprises the first PCTA polyester in an amount from about 70 to about 80 wt % and the second PCTA polyester in an amount from about 20 to about 30 wt %, based on the total weight of the blend.

In one embodiment, the polymer composition comprises less than 2 wt % of any additional additives.

In one embodiment, the blend has a $T_g$ of at least 85° C., an inherent viscosity (IV) of at least 0.80 dL/g and a $T_m$ of at least 255° C. In embodiments, the blend has an inherent viscosity (IV) of at least 0.80 dL/g, or at least 0.85 dL/g, or at least 0.88 dL/g.

In one aspect, an extruded polymer blend is provided, which comprises the polymer compositions discussed above.

In another aspect, the invention is directed to an article comprising the polymer compositions discussed above. In one embodiment, the article is an extruded film or an injection molded article. In one embodiment, the article is a component for an electronic device.

In one aspect, the invention is directed to a method for forming an article, comprising shaping, extruding, blow molding, or injection molding the polymer compositions discussed above.

In one aspect, the invention is directed to a film comprising the polymer compositions discussed above.

In one embodiment, a polyester film is provided comprising a melt formed polyester blend, wherein the polyester blend comprises a first PCTA copolyester and a second PCTA copolyester, wherein:

the first PCTA copolyester comprises:
(a) diacid residues comprising from about 90 to about 99 mole percent of terephthalic acid (TPA) residues and from about 1 to about 10 mole percent isophthalic acid (IPA) residues; and
(b) diol residues comprising at least 85 mole percent of 1,4-cyclohexanedimethanol (CHDM) residues, wherein the first PCTA copolyester comprises a total of 100 mole percent diacid residues and a total of 100 mole percent diol residues;

the second PCTA copolyester comprises:
(a) diacid residues comprising from about 60 to about 90 mole percent of TPA residues and from about 10 to about 40 mole percent IPA residues; and
(b) diol residues comprising at least 85 mole percent of CHDM residues, wherein the second PCTA copolyester comprises a total of 100 mole percent diacid residues and a total of 100 mole percent diol residues;

wherein the first PCTA copolyester is semi-crystalline;

wherein the second PCTA copolyester is amorphous;

wherein said blend comprises diacid residues comprising from about 5 to about 20 net mole percent of IPA residues, wherein the blend comprises a total of 100 mole percent diacid residues and a total of 100 mole percent diol residues; and wherein the film has a thickness in the range from about 25 to about 250 microns.

In one embodiment, the polyester film has an IV greater than 0.7 dL/g. In an embodiment, the polyester film is biaxially oriented and has a haze of less than 1%, and is capable of being annealed at a temperature of 150° C. for 90 minutes and maintaining a haze of less than 1%. In one embodiment, the polyester film further includes an ITO coating and having a sheet resistance of less than about 100 Ω/□.

In addition to transparent inorganic oxide coatings of the type described above, in embodiments of the invention, amorphous silicon and polycrystalline silicon can be used as the conductive coating for high-end display applications including active matrix TFT displays. In embodiments, amorphous silicon and polycrystalline silicon deposition processes with deposition being carried out between 200° C. and 350° C., or between 225° C. and 300° C., can be used with the substrate films described herein.

It is believed that films of the invention comprising the polymer compositions are superior to films in the art which comprise conductively coated substrates with respect to at least one of the following: transparency, conductivity, flexibility, charge carrier density, tensile and flexural properties, hydrolytic stability, substrate durability, and dimensional stability. The polymer compositions are believed to have sufficiently low crystallization rates in extrusion and sufficient crystallization rates in stretching and heat setting, to provide films having these improved qualities.

In yet another aspect, a method of making a film is provided. The method comprises blending a first PCTA copolyester and a second PCTA copolyester (as described herein); forming a melt processable polymer composition from the blend; melt extruding the melt processable polymer composition to form a sheet; and biaxially stretching the sheet to form a film.

The films can be used as substrates for additional layers or coatings, e.g., sputtered metal or metal oxide coatings. A high temperature polyester substrate according to the invention enables greater annealing temperature with shorter annealing time to achieve desired sheet resistance for ITO deposited films. In addition, the high temperature substrate also allows the sputtering power to be increased by more than 50%, which results in greater ITO deposit rate, shorter coating time, and higher throughput of ITO transparent conductive films (TCF). This higher temperature substrate according to the invention, due to its unique chemistry, has significantly lower oligomer migration than PET. Oligomer migration during processing and annealing will cause higher haze and lower visual light transparency (VLT) which are not desired for transparent conductive touch sensors. High temperature substrates are also needed for non-ITO TCF's, such as Ag NW (silver nanowire), Ag and Cu metal mesh, conductive polymer, CNT (carbon nanotube), and graphene, where high temperature thermal/UV curing or photonic sintering may be required. Heat stabilized PET quality will suffer if it has to be annealed off-line due to oligomer migration to film surface, which results in higher haze and lower VLT.

In one aspect, the present invention provides a melt processable polymer composition where the amount of net IPA mole % is adjusted by blending two or more polymers. The resulting blended composition will have higher crystallization half time for extrusion, compared to PCT or single component semi-crystalline PCTA resins, permitting it to be extruded successfully at lower line speed and thicker film without excessive crystallinity formation. In one embodiment, the melt processable polymer composition will have a crystallization rate similar to that of PET, permitting thicker films to be manufactured by using existing PET equipment.

Films according to the invention are believed to be superior to PET films in temperature dimensional stability, superior to glass in thickness/weight reduction and flexibility, and superior in transparency to polyimides.

In one embodiment, the films of the invention are capable of being coated with ITO and/or at least one other inorganic oxide at temperatures greater than or equal to 150° C. In another embodiment, the films of the invention comprise transparent conductively coated substrates which are heat stable (i.e., possessing good dimensional stability) at temperatures greater than or equal to 150° C. In other embodiments, the films of the invention comprising transparent conductively coated substrates are heat stable when coated with ITO and/or at least one other inorganic oxide at temperatures up to 225° C. In other embodiments, the films as described herein, when used in conductively coated substrates, do not blister or wrinkle and/or lose dimensional stability at the temperatures described herein.

In one aspect, the invention provides for a film comprising a biaxially-oriented polyester film that is produced from a polyester blend having a melting point ($T_m$) greater than 250° C.

In another aspect, the invention provides for a transparent conductively coated substrate comprising (a) a transparent conductive inorganic oxide coating and (b) a biaxially-oriented polyester film as described herein.

In yet another aspect, the invention provides for a conductively coated substrate comprising (a) an amorphous silicon or polycrystalline silicon conductive coating and (b) a biaxially-oriented polyester film as described herein.

The substrates according to the invention can be used in a variety of applications including, but not limited to, a liquid crystal display assembly, an organic light emitting diode display assembly, a photovoltaic device assembly, an architectural window or glazing, and a touch screen display.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

The present invention relates to the discovery that a biaxially-oriented high temperature polyester film having improved processing and/or physical properties can be produced from a polyester blend, including a semi-crystalline polyester and an amorphous polyester, containing TPA, IPA, and CHDM monomers and having a $T_g$ of 85° C. or higher.

PCTA means, for purposes of this application, acid modified poly(1,4-cyclohexylenedimethylene terephthalate) which contains diacid monomer residues comprising a majority of TPA residues and a minor amount of IPA residues, and diol residues comprising a majority of CHDM residues and, optionally, a minor amount of other diol residues.

By amorphous is meant essentially non-crystalline, that is having less than about ten percent (10%), preferably less than five percent (5%), and most preferably less than one percent (1%) crystalline content as defined by a DSC curve in which the difference in the enthalpy of crystallization exotherm and the enthalpy of fusion (melting) endotherm is less than about 2.9 cal/g (10%), preferably less than 1.45 cal/g (5%), most preferably less than 0.29 cal/g (1%).

By semi-crystalline is meant a crystalline content greater than about 10% as determined by a DSC curve and the difference in the enthalpy of crystallization exotherm and the enthalpy of fusion (melting) endotherm.

Unless specified otherwise, diacid monomer mole percent and diol mole % with respect to an individual polyester component (contained in a blend) are based on a total of 100 mole % diacid residues and 100 mole % diol residues for a total of 200 mole % of all monomer residues for the individual polyester component.

The term "net mole percent" for a monomer residue in a polyester blend means the total mole % of that monomer for the diacid or diol residues, respectively, contained in the total blend. For example, the net mole percent of a diacid monomer residue with respect to a polyester blend means the total amount of that diacid monomer (in mole percent) for all diacid residues (of all individual polymer components) contained in the blend. Thus, if polyester A contains 95 mole % TPA residues and 5 mole % IPA residues, based on 100 mole % diacid residues for polyester A; polyester B contains 75 mole % TPA resides and 25 mole % IPA residues, based on 100 mole % diacid residues for polyester B; and the blend contains 75 wt % polyester A and 25 wt % polyester B; then the blend has a net mole % of IPA residues of about 10%, based on the total diacid residues for the blend.

The term "melt formed polyester blend" means a melted (e.g., extruded) polymer made from two or more mechanically or physically mixed (e.g. blended) polyester polymers. For example, the two or more polyester polymers can be blended before being fed to an extruder or the two or more polyester polymers can be fed separately to the extruder and blended in the extruder. In the case of different solid polymer pellets, in one embodiment the pellets can be blended to provide a blend of different solid pellets. The pellets can be separately dried and then blended, mixed together and then dried, or mixed and dried simultaneously, prior to being fed to an extruder.

In one aspect, the invention is directed to polymer compositions comprising a blend of a first PCTA copolyester and a second PCTA copolyester, wherein:

the first PCTA copolyester comprises: (a) diacid residues comprising from about 90 to about 99 mole percent of TPA residues and from about 1 to about 10 mole percent IPA residues; and (b) diol residues comprising at least 85 mole percent of CHDM residues, wherein the first PCTA copolyester comprises a total of 100 mole percent diacid residues and a total of 100 mole percent diol residues;

the second PCTA copolyester comprises: (a) diacid residues comprising from about 60 to about 90 mole percent of TPA residues and from about 10 to about 40 mole percent IPA residues; and (b) diol residues comprising at least 85 mole percent of CHDM residues, wherein the second PCTA copolyester comprises a total of 100 mole percent diacid residues and a total of 100 mole percent diol residues;

wherein the first PCTA copolyester is semi-crystalline;
wherein the second PCTA copolyester is amorphous; and
wherein the blend comprises diacid residues comprising from about 5 to about 20 net mole percent of IPA residues, wherein the blend comprises a total of 100 mole percent diacid residues and a total of 100 mole percent diol residues.

In embodiments of the invention, the first PCTA copolyester comprises diacid residues comprising from 1 to 10, or 2 to 9, or 3 to 8, or 3 to 7, or 4 to 6 mole percent IPA residues. In one embodiment, the first PCTA copolyester comprises diacid residues comprising about 3 to about 7 mole percent IPA residues. In one embodiment, the first PCTA copolyester comprises diacid residues comprising about 5 mole percent IPA residues.

In embodiments of the invention, the first PCTA copolyester has a degree of crystallinity of about 30% or greater. In one embodiment, the first PCTA copolyester has a degree of crystallinity of about 40% or greater. In embodiments, the first PCTA copolyester has a degree of crystallinity from about 30% to about 50%. In one embodiment, the first PCTA copolyester has a degree of crystallinity from about 30% to about 40%. In one embodiment, the first PCTA copolyester has a degree of crystallinity from about 40% to about 50%. Crystallinity is determined by a DSC curve and the difference in the enthalpy of crystallization exotherm and the enthalpy of the fusion (melting) endotherm.

In embodiments of the invention, the second PCTA copolyester comprises diacid residues comprising from 10 to 40, or 15 to 35, or 20 to 30 mole percent IPA residues. In one embodiment, the second PCTA copolyester comprises diacid residues comprising about 20 to about 30 mole percent IPA residues. In one embodiment, the second PCTA copolyester comprises diacid residues comprising about 25 mole percent IPA residues.

In embodiments of the invention, the second PCTA copolyester has a degree of crystallinity of 0% up to 5%, or up to 4%, or up to 3%, up to 2%, up to 1%, up to 0.5%, up to 0.2% or up to 0.1%. In embodiments, the second PCTA copolyester has a degree of crystallinity of less than 1%. In embodiments, the second PCTA copolyester has a degree of crystallinity of less than 0.5%. In one embodiment, the second PCTA copolyester has a degree of crystallinity of about 0%.

In embodiments of the invention, the polymer composition comprises a blend of polyesters as discussed herein in amounts sufficient to provide a polymer blend comprising residues of:

a diacid content containing about 80 to 95 net mole % TPA and about 5 to about 20 net mole % IPA; and
a diol content containing about 85 to 100 net mole % CHDM, with the final polymer blend containing substantially equal molar proportions of acid equivalents (100 mole %) and diol equivalents (100 mole %) for a total of 200 mole % for all reactants.

In aspects of the invention, the diacid component of the first PCTA copolyester include but are not limited to at least one of the following ranges: 90 to 99 mole percent TPA and 1 to 10 mole percent IPA; 91 to 99 mole percent TPA and 1 to 9 mole percent IPA; 92 to 99 mole percent TPA and 1 to 8 mole percent IPA; 93 to 99 mole percent TPA and 1 to 7 mole percent IPA; 94 to 99 mole percent TPA and 1 to 6 mole percent IPA; 95 to 99 mole percent TPA and 1 to 5 mole percent IPA; 90 to 98 mole percent TPA and 2 to 10 mole percent IPA; 90 to 97 mole percent TPA and 3 to 10 mole percent IPA; 90 to 96 mole percent TPA and 4 to 10 mole percent IPA; 91 to 98 mole percent TPA and 2 to 9 mole percent IPA; 92 to 97 mole percent TPA and 3 to 8 mole percent IPA; 93 to 97 mole percent TPA and 3 to 7 mole percent IPA; wherein the first PCTA copolyester has a degree of crystallinity of at least 30%, or at least 40%; wherein the diacid component of the second PCTA copolyester comprises from 60 to 90 mole percent TPA and from 10 to 40 mole percent IPA; wherein the second PCTA copolyester has a degree of crystallinity of less than 5%, or less than 1%; and wherein the blend has a diacid content in at least one of the following ranges: 80 to 95 net mole % TPA and 5 to 20 net mole percent of IPA; 85 to 95 net mole % TPA and 5 to 15 net mole percent of IPA; 88 to 95 net mole % TPA and 5 to 12 net mole percent of IPA; or 90 to 95 net mole % TPA and 5 to 10 net mole percent of IPA.

In aspects of the invention, the diacid component of the second PCTA copolyester include but are not limited to at least one of the following ranges: 60 to 90 mole percent TPA and 10 to 40 mole percent IPA; 65 to 90 mole percent TPA and 10 to 35 mole percent IPA; 70 to 90 mole percent TPA and 10 to 30 mole percent IPA; 75 to 90 mole percent TPA and 10 to 25 mole percent IPA; 80 to 90 mole percent TPA and 10 to 20 mole percent IPA; 65 to 85 mole percent TPA and 15 to 35 mole percent IPA; 70 to 80 mole percent TPA and 20 to 30 mole percent IPA; wherein the second PCTA copolyester has a degree of crystallinity of less than 5%, or less than 1%; wherein the diacid component of the first PCTA copolyester comprises from 90 to 99 mole percent TPA and from 1 to 10 mole percent IPA; wherein the first PCTA copolyester has a degree of crystallinity of at least 30%, or at least 40%; and wherein the blend has a diacid content in at least one of the following ranges: 80 to 95 net mole % TPA and 5 to 20 net mole percent of IPA; 85 to 95 net mole % TPA and 5 to 15 net mole percent of IPA; 88 to 95 net mole % TPA and 5 to 12 net mole percent of IPA; or 90 to 95 net mole % TPA and 5 to 10 net mole percent of IPA.

In one embodiment, a polymer composition according to the invention is provided comprising a blend of a first polyester and a second polyester, wherein:

the first polyester comprises: (a) diacid residues comprising from about 95 to 100 mole percent of TPA residues and from 0 to about 5 mole percent IPA residues; and (b) diol residues comprising at least 85 mole percent of CHDM residues, wherein the first PCTA copolyester comprises a total of 100 mole percent diacid residues and a total of 100 mole percent diol residues;

the second polyester comprises: (a) diacid residues comprising from about 60 to about 90 mole percent of TPA residues and from about 10 to about 40 mole percent IPA residues; and (b) diol residues comprising at least 85 mole percent of CHDM residues, wherein the second PCTA copolyester comprises a total of 100 mole percent diacid residues and a total of 100 mole percent diol residues;

wherein the first polyester is semi-crystalline;
wherein the second polyester is amorphous; and
wherein the blend comprises diacid residues comprising from about 2 to about 15 net mole percent of IPA residues, wherein the blend comprises a total of 100 mole percent diacid residues and a total of 100 mole percent diol residues.

In one embodiment, the first polyester is PCT polyester which has diacid residues of 100 mole percent of TPA residues; and diol residues of 100 mole percent of CHDM residues, wherein the first polyester comprises a total of 100 mole percent diacid residues and a total of 100 mole percent diol residues. In embodiments, this PCT polyester has a degree of crystallinity of at least 30%, or at least 40%, or in a range from about 40% to about 50%.

In order to coat a polyester film at elevated temperatures, e.g., above temperatures used for metal oxide coatings, such as ITO sputtering, on PET, the polymer blend making up the film should have a melting point above 250° C., or above 260° C., or above 270° C.

A particular film according to an embodiment of the invention that meets these criteria can be produced from a polyester blend comprising:

(1) diacid residues comprising from about 85 to about 95 net mole percent of TPA residues, and from about 5 to about 15 net mole percent IPA residues; and (2) diol residues comprising at least 85 net mole percent of CHDM residues; wherein the polyester blend comprises a total of 100 mole percent diacid residues and a total of 100 mole percent diol residues, and the blend having a melting point of 260° C. or greater, and preferably 270° C. or greater.

In addition, such a film can be biaxially stretched and heat-set at temperatures up to 20° C. below the melting temperature. If the heat-set is insufficient in terms of temperature and time, it may not have sufficient dimensional stability during the coating process, e.g., a conductive inorganic oxide coating process.

In embodiments of the invention, the film is stretched or oriented at stretch ratios above 2.0× and at stretch temperatures above $T_g$. In one embodiment, the film is stretched between 2.5 and 3.5× at temperatures between $T_g$ and $T_g+20°$ C., and then heat-set at an actual film temperature of up to about 20° C. below $T_m$, where $T_m$ is the melting point of the polymer blend, for 1 to 120 seconds, or for 1 to 60 seconds, while maintaining the dimensions of the stretched film. It is preferred that the biaxially-oriented and heat-set polyester film has dimensional stability at temperatures greater than 150° C., or greater than 180° C., or greater than 200° C., such that delaminating or cracking of an inorganic oxide coating does not occur during use of the resulting conductively coated substrate or in the preparation and/or curing of the conductive coating.

A conductive coating may be applied onto a film or substrate according to the invention. The conductive coating can be applied by a number of processes well known in the art including sputtering, chemical vapor deposition, electron beam evaporation, pulsed laser deposition, and plasma-enhanced chemical vapor deposition, among others. The conductive coating can be deposited over a range of multiple thicknesses, and the conductively coated substrate can optionally be coated with an oxygen and/or moisture barrier layer.

The "conductive coating" refers to a transparent conductive inorganic and/or conductive polymer layer. The "transparent conductive inorganic oxide layer" is commonly known in the art and can include but is not limited to tin oxide, indium tin oxide (ITO), zinc oxide, indium oxide, tin-antimony composite oxide, indium-zinc composite oxide, zinc-aluminum composite oxide, and derivatives thereof.

Indium Tin Oxide (ITO) sputtering companies are under competitive pressure from non-ITO alternatives such as printed AgNW (silver nanowire) and metal mesh, particularly for larger area Projected Capacitive Touchscreen formats, due to lower surface resistance and greater flexibility offered by alternatives. High temperature substrates according to the invention should: (1) allow ITO sputtering producers to remain competitive by improving manufacturing economics and providing reduced sheet resistance; (2) allow for reduced annealing time enabled by higher annealing temperatures for less time to achieve target sheet resistance; (3) allow for reduced sheet resistance enabled by higher annealing temperatures for the same time and (4) enable non-ITO alternatives to improve processing efficiencies (e.g., faster drying and curing) and sheet resistance compare to PET substrates.

PET is currently used as substrate for TCF's due to its low cost and generally balanced properties. However, PET substrate has some shortcomings, including: 1) a need for a barrier coating, due to high oligomer migration, which adds to production costs; 2) a relatively slow ITO sputtering process, because PET becomes distorted if high power is applied; 3) a relatively long post annealing is required for PCAP ITO film to achieve desired conductivity, because the operation temperature of PET is limited to 150° C. or lower; and 4) a relatively low temperature resistance, making it unsuitable for some non-ITO applications that require high temperature drying or curing, and unsuitable for printed electronics that utilize photonic curing by a flash lamp to sinter the silver or copper nanoparticle ink at very high temperature. A high temperature substrate according to the present invention will address these shortcomings and provide a wider process window with less substrate distortion compared to PET substrate.

The polyesters used to prepare the blends and films according to the present invention can be readily prepared by conventional methods well known in the art. For example, melt-phase or a combination of melt-phase and solid-phase polycondensation techniques may be used depending on the degree of crystallization desired. The first PCTA polyester is a semi-crystalline polymer typically prepared by a combination of melt-phase and solid-phase polycondensation. In one embodiment, the first PCTA polyester has an inherent viscosity (IV) of about 0.8 to 1.2, or about 0.9 to 1.1.

The second PCTA polyester is an amorphous polymer and is typically prepared by melt-phase polycondensation, and without solid-phase polycondensation. In one embodiment, the second PCTA polyester is amorphous and has an inherent viscosity (IV) of about 0.5 to 1.0, or about 0.6 to 0.9, or about 0.65 to about 0.85.

Films at an IV less than 0.7 may experience a reduction in tear resistance. As used herein, IV refers to viscosity determinations made at 25° C. using 0.50 gram of polymer per 100 mL of a solvent composed of 60 weight percent phenol and 40 weight percent tetrachloroethane. The basic method of determining the IV of the polyesters herein is set forth in ASTM method D2857-95.

In embodiments, in addition to CHDM, other glycols that can be included in minor amounts in the PCTA polymers include ethylene glycol, 1,3-propanediol, 1,6-hexanediol, neopentyl glycol and 2,2,4,4-tetramethyl-1,3-cyclobutanediol. In one embodiment, the first PCTA polyester and the second PCTA polyester each include ethylene glycol residues. In one embodiment, the first PCTA polyester and the second PCTA polyester each include diol residues of 100 mole percent CHDM residues.

The CHDM residues in the polyester compositions may have any combination of cis and trans isomer ratios. Preferably, the CHDM residues have a trans isomer content in the range of about 60 to 100%.

Examples of catalyst materials that may be used in the synthesis of the polyesters utilized in the present invention include titanium, manganese, zinc, cobalt, antimony, gallium, lithium, calcium, silicon, and germanium. Such catalyst systems are described in U.S. Pat. Nos. 3,907,754, 3,962,189, 4,010,145, 4,356,299, 5,017,680, 5,668,243 and 5,681,918, herein incorporated by reference in their entirety. Preferred catalyst metals include titanium and manganese, and most preferred is titanium. The amount of catalytic metal used may range from about 5 to 100 ppm, but the use of catalyst concentrations of about 5 to about 35 ppm titanium is preferred in order to provide polyesters having good color, thermal stability, and electrical properties.

Phosphorus compounds can be used in combination with the catalyst metals, and any of the phosphorus compounds normally used in making polyesters may be used. Typically, up to about 100 ppm phosphorus may be used.

Although not required, other additives typically present in polyesters may be used, if desired, so long as they do not hinder the performance of the polyesters used to prepare the films. Such additives may include, but are not limited to, antioxidants, ultraviolet light and heat stabilizers, metal deactivators, colorants, pigments, pinning agents, impact modifiers, nucleating agents, branching agents, flame retardants, and the like.

Branching agents useful in making the polyesters formed within the context of the invention can be ones that provide branching in the acid unit portion of the polyester, or in the glycol unit portion, or it can be a hybrid. Some examples of branching agents are polyfunctional acids, polyfunctional anhydrides, polyfunctional glycols and acid/glycol hybrids. Examples include tri- or tetracarboxylic acids and their corresponding anhydrides, such as trimesic acid, pyromellitic acid, and lower alkyl esters thereof and the like, and tetrols such as pentaerythritol. Also, triols such as trimethylopropane or dihydroxy carboxylic acids and hydroxydicarboxylic acids and derivatives, such as dimethyl hydroxy terephthalate, and the like are useful within the context of this invention. Trimellitic anhydride is a preferred branching agent.

In embodiments of the invention, the total amount of additives in the polymer composition, which comprises the polyester blends described herein, is less than 5, or less than 4, or less than 3, or less than 2, or less than 1 weight percent, based on the total weight of the polymer composition. In embodiments, the polymer composition can include additives in an amount from about 0.1 to about 2, or about 0.1 to about 1 weight percent, based on the total weight of the polymer composition. In one embodiment, the polymer composition includes no additives other than residual catalyst.

In embodiments of the invention, the PCTA polyester blend is crystallizable and has a melting point greater than about 250° C., or greater than about 260° C. Melting points were measured herein using differential scanning calorimetry (DSC) in accordance with ASTM D3418-15.

The polyester films of the invention may be generated from blends of pellets of two or more PCTA resins as long as the blend and final film composition fits the composition parameters described herein. For example, blends can be made from different PCTA polyesters containing from 0 to 50 mole % IPA, or 1 to 50 mole % IPA monomer residues in various ratios, as long as the final blended composition meets the criteria stated herein. In one embodiment, the blend can be made from two or more different polyesters provided that the blend comprises diacid residues of only TPA and IPA, and diol residues of at least 85 net mole % CHDM, preferably only CHDM.

In the first step of a process for preparing the polyester film or sheet material, a melt of the polyester blend described herein can be extruded into an amorphous or low crystallinity film at any temperature known below the point where unacceptable IV degradation occurs and the polymer blend can be extruded under typical extrusion parameters, e.g., typically at a temperature of about 270 to 310° C. The thickness of the unstretched (or unoriented) film can typically be in the range of 100 to 2000 microns, more typically about 200 to 1000 microns. The initial film extrusion can be performed by any usual method, including but not restricted to extrusion on a single-screw extruder or extrusion on a twin-screw extruder.

In the second step, the film can be stretched or oriented at stretch ratios above 2× and at stretch temperatures above $T_g$. Preferably, the cast film is stretched or oriented at stretch ratios between 2.5 and 4× at temperatures between $T_g$ and $T_g+20°$ C. The designation "X" refers to the stretch ratio, which is the extent to which the film is stretched relative to the original dimensions of the film. For example, 2× means that the film has been stretched to a dimension that is twice its original dimension. More preferably, the film is stretched at a ratio of about 2.5× to 4× in the machine direction (MD) and about 2.5× to 4× in the transverse direction (TD) at stretching temperatures between $T_g$ and $T_g+20°$ C., either sequentially or simultaneously. Stretching beyond 4× may overstretch and break the film.

After stretching, the film can be heat-set at actual film temperatures from up to 20° C. below the $T_m$, wherein $T_m$ is the melting point of the polymer as measured by differential scanning calorimetry (DSC), for a period of time greater than about 5 seconds, or greater than about 30 seconds, and typically between about 30 seconds and 60 seconds. The initial film extrusion can be performed immediately prior to stretching (i.e., in-line), or at a separate time (i.e., off-line). During heat-setting, the stretched film can be maintained in the stretched dimensions of the film, by means of a tenter frame or other mechanical device that prevents excessive relaxation of the stretched film during heat-setting. During heat-setting, the film can be stretched or relaxed by up to 10%, i.e., the overall dimension of the film can be increased or decreased by up to 10%.

With any of these methods, it is possible to do sequential biaxial stretching, simultaneous biaxial stretching, uniaxial stretching, or combinations thereof. Simultaneous biaxial stretching involves stretching the machine and transverse directions of the film at the same time. In a simultaneous biaxial stretch, the stretch ratio does not have to be the same in the transverse direction as it is in the machine direction. Sequential biaxial stretching involves first stretching in the machine direction, for example, in a roll to roll stretch, and then subsequently stretching in the transverse direction, for example, using a tenter frame. In a sequential stretching process, the two stretches may be performed one immediately after the other (i.e., in line) or at separate times (i.e., off-line). The machine direction is defined as the long direction of the film, as it is rolled. The transverse direction is defined as the width of the film, i.e., the direction perpendicular to the machine direction. If a sequential biaxial stretch is performed, the stretch ratio and temperature of the stretch do not have to be the same in the transverse direction as it is in the machine direction.

The stretched or oriented polyester film can be heat-set according to known methods. For example, heat-setting may occur in a continuous process such as by passing a roll of stretched film continuously through an oven, or in a batch process such as by individually placing the films in heat-set frames in a heat-setting oven for a fixed length of time. Heat-setting may be performed immediately after stretching (i.e., in-line), or at separate times (i.e., off-line). The film may be relaxed or expanded by up to 10% during heat-setting.

The number of stretching and heat-setting steps may be varied. The polyester film may be subjected to a single stretch and a single heat-set pass or treatment, a single stretch and multiple heat-set passes, multiple stretches and a single heat-set pass, or multiple stretches and multiple heat-set passes. If multiple stretches and/or heat-set passes are performed, it is possible that the stretches and heat-set passes may alternate in timing, but it is also possible that one heat-set pass may follow a prior heat-set pass without an intervening stretch pass. The conditions of each pass do not have to be the same as the previous pass. For example, the polyester film may be heat-set by a two-stage heat-set process whereby the first heat-set is performed at any actual film temperature above the stretch temperature. Subsequently, the film is heat-set a second time at actual film temperatures up to 20° C. below $T_m$, wherein $T_m$ is the melting point of the polymer, measured by DSC (differential scanning calorimetry). The polyester film component of the transparent conductive substrate of the present invention can have a final thickness value, i.e., after stretching and heat-setting, of about 12-500 microns.

Conductively coated substrates according to the invention may be used in a variety of applications including a liquid crystal display assembly, an organic light emitting diode display assembly, a photovoltaic device assembly, an architectural window or glazing, electronic smart window, and a touch screen display. The coated substrate as a component of the aforementioned devices may serve as the electronic conductive component of a display or photovoltaic device. For example, in the case of an amorphous silicon or polycrystalline silicon coated substrate, the coated substrate would constitute the TFT backplane driver for the flat panel display. In the case of a photovoltaic device, the ITO coated substrate could serve as the conductive layer responsible for transporting electrical energy generated by the active component of the photovoltaic device.

In embodiments of the invention, the polyester film can be vacuum coated with ITO or other materials using at least 40%, or at least 50%, more power, or a faster line speed, than is used for PET substrate having an equivalent thickness.

The ITO vacuum coated polyester film according to the invention can have a sheet resistance of 400Ω/□ or lower. In embodiments, the sputtered film can be further annealed at 150° C. to 200° C. for 30 to 90 min with reduction in sheet resistance to 100Ω/□ or less, or to 50Ω/□ or less.

In one aspect, the invention is directed to a projected capacitive touch sensor comprising at least one biaxially oriented high temperature polyester film as described herein, wherein the polyester film is wet or dry coated with index matched layers with Indium Tin Oxide (ITO) to provide a high VLT and low haze transparent conductive film for portable electronic devices or other electronics such as are used in automobiles etc.

In another aspect, a window film is provided comprising at least one biaxially oriented high temperature polyester film as described herein, wherein the polyester film is vacuum deposited with multilayer dielectric and metal coatings to provide a film that reflects IR for solar energy rejection, while maintain at least 70% VLT. In one embodiment, the film can be vacuum coated with multilayer dielectric/metal coatings using at least 40% more, or at least 50% more, power, or faster line speed, than is used for a PET substrate of the equivalent thickness.

In another aspect, a non-ITO transparent conductive film is provided which comprises at least one biaxially oriented high temperature polyester film as described herein, wherein the polyester film is coated with conductive layer(s) which can be AgNW, Ag Mesh, Cu Mesh, and/or conductive polymer such as PEDOT:PSS. In embodiments, the wet coated layers are dried and cured at higher temperature than a temperature where PET substrate would distort due to heat.

In yet another embodiment, a printed electronic device is provided which comprises at least one biaxially oriented high temperature polyester film as described herein, wherein metal inks (e.g., Ag or Cu) are heated briefly with a flash lamp to very high temperature (photonic curing or sintering) after printing. In one embodiment, the photonic curing or sintering occurs at temperatures above a temperature where PET substrate will distort.

In yet another embodiment, a printed electronic device is provided which comprises at least one biaxially oriented high temperature polyester film as described herein, wherein metal inks (e.g., Ag or Cu) are heated briefly with a flash lamp to very high temperature (photonic curing or sintering)

after printing. In one embodiment, the photonic curing or sintering occurs at temperatures above a temperature where PET substrate will distort.

In one embodiment, a transparent conductive film is provided comprising (1) a biaxially oriented copolyester film; and (2) a conductive coating, wherein the biaxially oriented copolyester film comprises a melt formed polyester blend of a first PCTA copolyester and a second PCTA copolyester;
  the first PCTA copolyester comprises: (a) diacid residues comprising from about 90 to about 99 mole percent of terephthalic acid (TPA) residues and from about 1 to about 10 mole percent isophthalic acid (IPA) residues; and (b) diol residues comprising at least 85 mole percent of 1,4-cyclohexanedimethanol (CHDM) residues, wherein the first PCTA copolyester comprises a total of 100 mole percent diacid residues and a total of 100 mole percent diol residues;
  the second PCTA copolyester comprises: (a) diacid residues comprising from about 60 to about 90 mole percent of TPA residues and from about 10 to about 40 mole percent IPA residues; and (b) diol residues comprising at least 85 mole percent of CHDM residues, wherein the second PCTA copolyester comprises a total of 100 mole percent diacid residues and a total of 100 mole percent diol residues;
  wherein the melt formed polyester blend comprises the first PCTA copolyester in an amount from about 65 to 95 wt %, and the second PCTA copolyester in an amount from 5 to about 35 wt %,
  wherein the first PCTA copolyester is semi-crystalline,
  wherein the second PCTA copolyester is amorphous,
  wherein said melt formed polyester blend comprises diacid residues comprising from about 5 to about 20 net mole percent of IPA residues, wherein the melt formed polyester blend comprises a total of 100 mole percent diacid residues and a total of 100 mole percent diol residues, and
  wherein the film has a thickness in the range from about 25 to about 250 microns.

In one class of this embodiment, the melt formed polyester blend comprises the first PCTA copolyester in an amount from about 70 to about 90 wt % and the second PCTA copolyester in an amount from about 10 to about 30 wt %. In one class of this embodiment, the melt formed polyester blend comprises the first PCTA copolyester in an amount from about 75 to 85 wt % and the second PCTA copolyester in an amount from 15 to about 25 wt %. In one class of this embodiment, the melt formed polyester blend comprises the first PCTA in an amount from about 70 to about 95 wt % and the second PCTA copolyester in an amount from about 5 to about 30 wt %.

In one class of this embodiment, the transparent conductive film has a haze of less than 4%. In one class of this embodiment, the transparent conductive film has a haze of less than 2%. In one class of this embodiment, the transparent conductive film has a haze of less than 1%. In one class of this embodiment, the transparent conductive film has a haze of less than 0.9%. In one class of this embodiment, the transparent conductive film has a haze of less than 0.8%. In one class of this embodiment, the transparent conductive film has a haze of less than 0.7%. In one class of this embodiment, the transparent conductive film has a haze of less than 0.6%. In one class of this embodiment, the transparent conductive film has a haze of less than 0.5%. In one class of this embodiment, the transparent conductive film has a haze of less than 0.4%.

In one class of this embodiment, the melt formed polyester blend comprises less than 2 wt % of any additional additives.

In one class of this embodiment, the first PCTA copolyester has an inherent viscosity of about 0.8 to 1.2 dL/g, and the second PCTA copolyester has an inherent viscosity of about 0.5 to 1.0 dL/g. In one subclass of this class, the second PCTA copolyester has an inherent viscosity of about 0.6 to about 0.9 dL/g. In one subclass of this class, the second PCTA copolyester has an inherent viscosity of about 0.65 to about 0.85 dL/g.

In one subclass of this class, the first PCTA copolyester has an inherent viscosity of about 0.9 to 1.1 dL/g. In one sub-subclass of this subclass, the second PCTA copolyester has an inherent viscosity of about 0.6 to about 0.9 dL/g. In one sub-subclass of this subclass, the second PCTA copolyester has an inherent viscosity of about 0.65 to about 0.85 dL/g.

In one class of this embodiment, the biaxially oriented copolyester film has an inherent viscosity of greater than 0.7 dL/g. In one class of this embodiment, the biaxially oriented copolyester film has an inherent viscosity of greater than 0.75 dL/g In a class of this embodiment, the transparent conductive film maintains a haze of less than 1% after being annealed for 90 min at 150° C. In a class of this embodiment, the transparent conductive film maintains a haze of less than 0.9% after being annealed for 90 min at 150° C. In a class of this embodiment, the transparent conductive film maintains a haze of less than 0.8% after being annealed for 90 min at 150° C. In a class of this embodiment, the transparent conductive film maintains a haze of less than 0.7% after being annealed for 90 min at 150° C. In a class of this embodiment, the transparent conductive film maintains a haze of less than 0.6% after being annealed for 90 min at 150° C.

In one class of this embodiment, the conductive coating comprises a metal oxide, carbon nanotubes, poly(3,4-ethylenedioxythiophene) ("PEDOT"), poly(4,4-dioctylcyclopentadithiophene, or silver nanowire. In one subclass of this class, the conductive coating is applied by sputtering. In one class of this embodiment, the conductive coating comprises carbon nanotubes. In one subclass of this class, the conductive coating is applied by sputtering. In one class of this embodiment, the conductive coating comprises PEDOT. In one subclass of this class, the conductive coating is applied by sputtering. In one class of this embodiment, the conductive coating comprises silver nanowire. In one subclass of this class, the conductive coating is applied by sputtering. In one class of this embodiment, the conductive coating comprises a metal oxide. In one subclass of this class, the conductive coating is applied by sputtering. In one subclass of this class, the metal oxide is chosen from indium oxide, indium tin oxide, indium zinc oxide, zinc aluminum oxide, zinc gallium oxide, titanium niobium oxide, and cadmium indium oxide. In one sub-subclass of this subclass, the conductive coating is applied by sputtering. In one subclass of this class, the metal oxide is indium oxide. In one sub-subclass of this subclass, the conductive coating is applied by sputtering. In one subclass of this class, the metal oxide is indium tin oxide. In one sub-subclass of this subclass, the conductive coating is applied by sputtering. In one subclass of this class, the metal oxide is indium zinc oxide. In one sub-subclass of this subclass, the conductive coating is applied by sputtering. In one subclass of this class, the metal oxide is zinc aluminum oxide. In one sub-subclass of this subclass, the conductive coating is applied by sputtering. In one subclass of this class, the metal oxide is zinc gallium oxide. In one sub-subclass of this subclass, the conductive coating is applied by sputtering. In one subclass of this class, the metal oxide is titanium niobium oxide. In one sub-subclass of this subclass, the conductive coating is applied by sputtering. In one subclass of this class, the metal oxide is cadmium indium oxide. In one sub-subclass of this subclass, the conductive coating is applied by sputtering.

This invention can be further illustrated by the following examples of preferred embodiments thereof, although it will be understood that these examples are included merely for purposes of illustration and are not intended to limit the scope of the invention. Unless otherwise indicated, all weight percentages are based on the total weight of the polymer composition and all molecular weights are weight average molecular weights. Also, all percentages are by weight unless otherwise indicated. Unless indicated otherwise, parts are parts by weight, temperature is in degrees C. or is at room temperature, and pressure is at or near atmospheric.

EXAMPLES

The polymer compositions and films and the preparation thereof according to the present invention are further illustrated by the following examples.

In the following examples, thermal shrinkage (film shrinkage/dimensional stability) was determined by a TA Instruments, model Q400, thermo mechanical analyzer (TMA) instrument, using film samples of 14 mm in length by 3 mm in width.

Unless stated otherwise, the glass transition temperature ($T_g$) and melting temperature ($T_m$) were determined using a TA DSC 2920 instrument from TA Instruments at a scan rate of 20° C./min according to ASTM D3418-15. Each sample of 7.5 mg was sealed in an aluminum pan and heated to 290° C. at a rate of 20° C./minute. The sample was then cooled to below its glass transition at a rate of about 320° C./minute to generate an amorphous specimen. The melt temperature, $T_m$, corresponds to the peak of the endotherm observed during the scan.

Unless stated otherwise, inherent viscosity (IV) was determined by measuring at a temperature of 25° C. at 0.5 g/dL concentration in a solvent mixture of symmetric tetrachloroethane and phenol having a weight ratio of symmetric tetrachloroethane to phenol of 2:3 according to ASTM D4603.

The diol and diacid content of the compositions was determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers.

The crystallization half-time, $t_{1/2}$, was determined using a Perkin-Elmer Model DSC-2 differential scanning calorimeter. Each polymer sample (of 7.5 mg) was sealed in an aluminum pan and heated to 325° C. at a rate of about 320° C./min for 2 minutes. The sample was then quenched on the chilled block which has a temperature below room temperature. After the DSC is cooled to a temperature 30° C. below the glass transition temperature of the sample, the quenched sample was then put back to the DSC cell and heated to the predetermined isothermal crystallization temperature at a rate of about 320° C./minute in the presence of helium. The crystallization half time is determined as the time from reaching the isothermal crystallization temperature to the crystallization peak on the DSC curve.

The haze % was measured using a Hunterlab spectrophotometer according to ASTM D1003.

Figure 1:
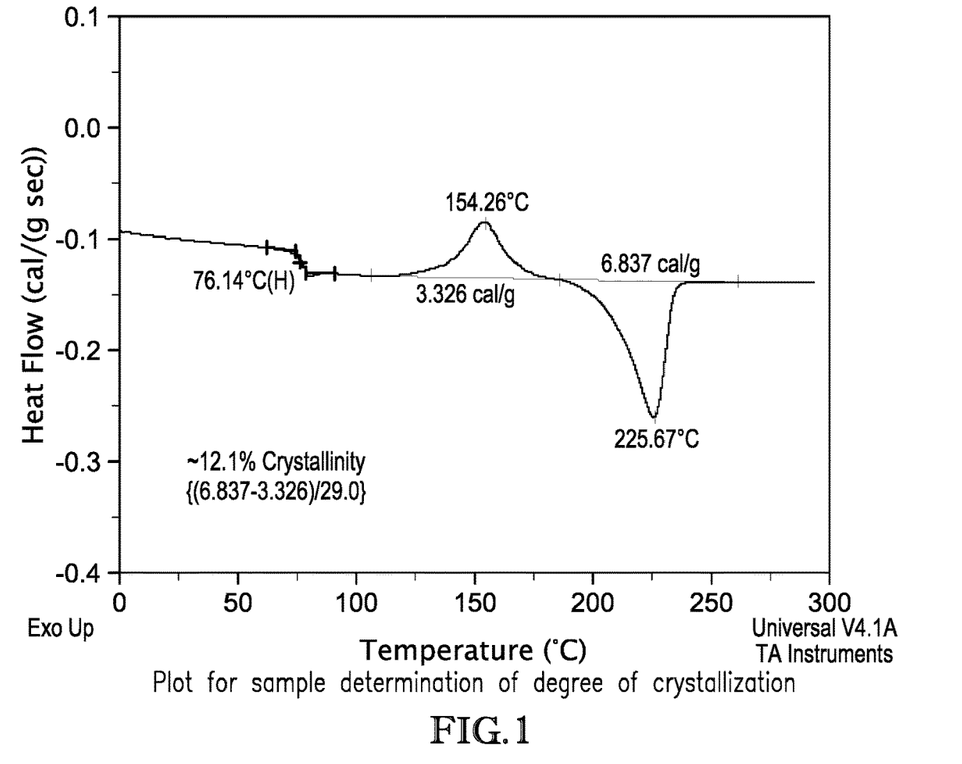
FIG. 1 is a graph of melt flow as a function of temperature for a PCTA polymer used for calculation of the degree of crystallization for the polymer.

The degree of crystallization was determined using a using a Perkin-Elmer Model DSC-2 differential scanning calorimeter and plotting heat flow versus temperature using a 7.5 mg sample and heating the sample in N2 purge at 20° C./min from RT to 325° C. The degree of crystallization is determined from the plot by calculating the area of the crystallization peak above the steady state heat flow and the area of the melting peak below the steady state heat flow, calculating the difference in areas and dividing by a constant based on the theoretical heat of fusion for 100% crystalline PCTA (29 cal/g). An example of a degree of crystallization calculation is shown in FIG. 1. A review of FIG. 1, reveals that that points A and B, and intersect C, was determined by drawing a straight line along the steady state portions of the curve, measuring the area of crystallization peak at 154° C. between points A & C (Hc=3.326 cal/g), measuring the area of melting peak at 225° C. between points B & C (Hf=6.837 cal/g), and calculating the sample by the equation: % crystallinity=(Hf−Hc)/29=(6.837−3.326)/29100%=12.1% crystallinity.

Unless otherwise specified, the cis/trans ratio of the 1,4 cyclohexanedimethanol used in the following examples was approximately 30/70, and could range from 35/65 to 25/75.

The following abbreviations apply throughout the working examples and figures:

| | |
|---|---|
| TPA | Terephthalic acid |
| IPA | Isophthalic acid |
| CHDM | 1,4-cyclohexanedimethanol |
| EG | Ethylene Glycol |
| IV | Inherent viscosity |
| PCAP | Projected capacitive film |
| ITO | Indium Tin Oxide |
| TCF | Transparent conductive film |
| $InO_x$ | Undoped indium oxide |
| MD | Machine direction film stretching |
| TD | Transverse direction film stretch |
| $t_{1/2}$ | Crystallization half time, min |
| $T_m$ | Melting Point, ° C. |
| $T_g$ | Glass transition temperature, ° C. |
| RT | Room temperature |

PCTA Polymers

PCTA polymers were prepared as follows:

PCTA 1: Pellets of PCTA copolyester having diacid residues of 95 mole percent TPA residues and 5 mole percent IPA residues, and diol residues of 100 mole percent CHDM residues, wherein the PCTA copolyester comprises a total of 100 mole percent diacid residues and a total of 100 mole percent diol residues, were prepared. The pellets were prepared in a melt-phase polycondensation process using 100 ppm Ti catalyst (as titanium isobutoxide) and then subjected to solid-phase polycondesation to provide a degree of crystallization of 45%.

PCTA 2: Pellets of PCTA copolyester having diacid residues of 74 mole percent TPA residues and 26 mole percent IPA residues, and diol residues of 100 mole percent CHDM residues, wherein the PCTA copolyester comprises a total of 100 mole percent diacid residues and a total of 100 mole percent diol residues, were prepared. The pellets were prepared in a melt-phase polycondensation process using 100 ppm Ti catalyst (as titanium isobutoxide). The resulting pellets were amorphous having a degree of crystallization of less than 1%.

The properties of PCTA 1 and PCTA 2 are listed below in Table 1.

TABLE 1

Basic Properties of PCTA 1 and PCTA 2

|  | PCTA 1 | PCTA 2 |
|---|---|---|
| Glass Transition Temperature $T_g$, ° C. | 93.0 | 88.6 |
| IPA mole % | 5 | 26 |
| Melt Temperature $T_m$, ° C. | 283 | 242 |
| Crystallization Half time $t_{1/2}$, min | 0.41 | 4.84 |
| Resin IV, dL/g | 0.96 | 0.72 |
| Pellet | crystallized | amorphous |

Comparative Example 1

Pellets of PCT homopolymer having diacid residues of 100 mole percent TPA residues and diol residues of 100 mole percent CHDM residues, wherein the PCT copolyester comprises a total of 100 mole percent diacid residues and a total of 100 mole percent diol residues, were prepared. The pellets were prepared in a melt-phase polycondensation process using 100 ppm Ti catalyst (as titanium isobutoxide) and then subjected to solid-phase polycondesation to provide a degree of crystallization of about 45%. The properties of the PCT homopolymer are shown below in Table 2.

Comparative Example 2 and Examples 3-5

Comparative Example 2 is PCTA 1, which is a single component PCTA copolymer and not blended with any PCTA 2. Examples 3-5 are blends of PCTA 1 and PCTA 2 in amounts sufficient to provide a net IPA mole % as shown below in Table 2. The properties of Comparative Example 2 and Examples 3-5 are listed in Table 2.

Comparative Example 6

Comparative Example 6 was a commercially available 2 mil PET film (Melinex ST 579 PET, available from DuPont Teijin Films). The PET film had a degree of crystallization of about 40%. The properties of the PET polyester are shown below in Table 2.

TABLE 2

Thermal properties and crystallization half times

|  | Comp EX1 | Comp EX2 | EX3 | EX4 | EX5 | Comp EX6 |
|---|---|---|---|---|---|---|
| IPA mole % | 0 | 5 | 10 | 15 | 20 | PET |
| $T_g$, ° C. | 94 | 93 | 92 | 91 | 90 | 80 |
| $T_m$, ° C. | 288 | 283 | 273 | 263 | 253 | 250 |
| $t_{1/2}$, min | 0.23 | 0.41 | 0.76 | 1.41 | 2.60 | 0.8 |

A review of Table 2 reveals that the PCT polymer (comparative Example 1) has a lower crystallization half time. Extruding thicker optical grade PCT sheet was very difficult since it could not be quenched quickly on a chill roll to minimize thermally induced crystallinity, especially for heavy gauge sheet as illustrated below in Table 3. Extruded sheet with higher crystallinity became hazy (or white) and brittle for subsequent MD and TD stretching. PCTA (PCT modified with IPA) having higher mole % content of IPA (as shown in Table 2) prevents fast crystallization and enables film stretching at greater draw ratios.

TABLE 3:

PCT extruded sheet thickness and corresponding thermally induced crystallinity

| PCT Thickness | | Crystallinity |
|---|---|---|
| μm | mil (.001 in) | % |
| 100 | 4 | 8 |
| 400 | 16 | 12 |
| 550 | 22 | 14 |
| 1100 | 43 | 27 |
| 1350 | 53 | 32 |

A review of Table 2 also reveals that PCTA has higher crystallization half times with increasing IPA content. PCTA having 5-20 mole % IPA had higher $T_g$ and $T_m$ compared to Comparative EX 6 PET homopolymer as shown in Table 2. PCTA with 5% IPA can be extruded and biaxially oriented into thin film, such as 1-2 mil (1 mil=25.4 μm) film. For thicker biaxially oriented film, more IPA modification was needed. PCTA with 10 mole % IPA (Ex 3) had a similar crystallization half time to that of the PET. The PCTA blend of Ex 3 (with 10 mole % IPA) could be melt processed and a film produced with a similar thickness range as the PET homopolymer.

Films were prepared for the PCTA polymers according to Comparative Examples 2, and Examples 3-5 as follows: sheets were first produced with a Killion extruder using 1.5" OD screw into 20 mil sheet. The sheet was then cut into 4"×4" samples and biaxially stretched with a Brueckner Karo IV film stretcher. The stretching ratios were 3.3×3.2 (MD×TD). The stretching temperature was 110° C. and strain rate was 100%. Comparative Example 6 was commercially available 2 mil PET film (Melinex ST 579 PET, available from DuPont Teijin Films). The stretched samples (Comp EX 2 and EXs 3-5) were annealed in a separate hot air oven, along with and the PET film (Comp EX 6), at 150° C. according to Table 4 below.

Optical clarity is a must for transparent conductive touch sensors. For ITO PCAP TCF, it has to be annealed at high temperature, such as 150° C. for about an hour to achieve low enough sheet resistance, which provides sufficient touch sensitivity for end user satisfaction in smart phones, tablets, and PCs. Excessive haze development in the annealing process is thus not desired. Percentage of haze as a function of annealing time at 150° C. for the films according to Comparative Examples 2 and 6 and Examples 3-5 are shown below in Table 4 and in FIG. 2.

TABLE 4

Haze development due to oligomer migration during annealing at 150° C.

| EX | | Initial Haze % | % Haze 150° C. for 30 min | % Haze 150° C. for 60 min | % Haze 150° C. for 90 min |
|---|---|---|---|---|---|
| Comp EX 2 | 5 mole % IPA | 0.12 | 0.16 | 0.17 | 0.2 |
| EX 3 | 10 mole % IPA | 0.14 | 0.27 | 0.47 | 0.59 |
| EX 4 | 15 mole % IPA | 0.16 | 0.28 | 0.37 | 0.72 |
| EX 5 | 20 mole % IPA | 0.08 | 0.44 | 0.42 | 0.36 |
| Comp EX 6 | PET | 0.85 | 2.75 | 7.15 | 23.95 |

Figure 2:
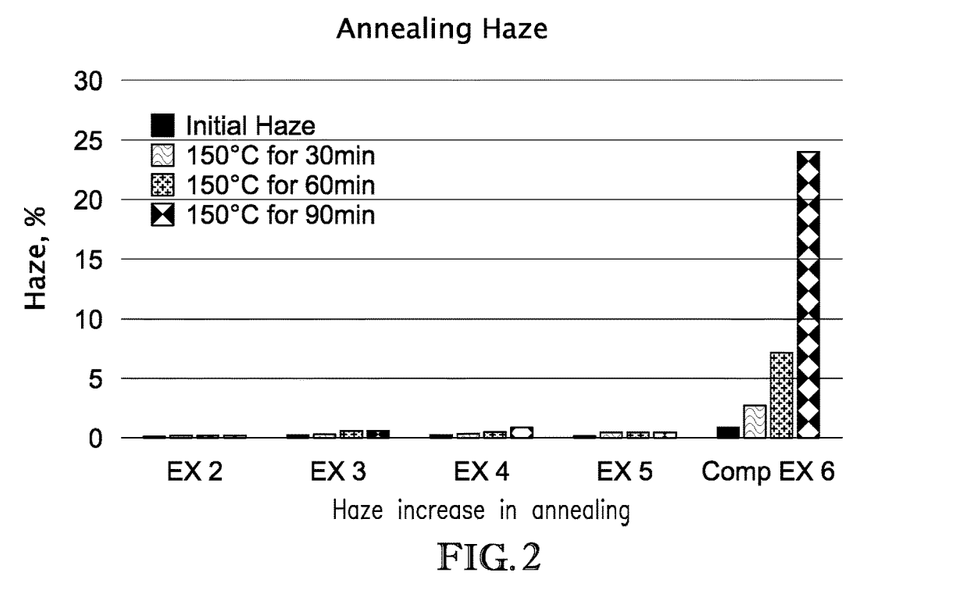
FIG. 2 is a graph showing the effect of annealing time on haze for polyester films.

A review of Table 4 and FIG. 2 shows that PCTA (Comparative EX 2) and PCTA blends (EXs 3-5) did not develop haze during annealing, while the haze of PET film (Comp EX 6) rapidly increased to a point where it was not acceptable.

Comparative Examples 7 and 8

Thermal shrinkage of PCTA and PET films were evaluated by comparing a 1 mil heat stabilized PCTA (Comp EX 2) film, prepared in a similar manner to the PCTA films discussed above, and a commercially available 1 mil PET film (Mitsubishi 7SLK 1 mil PET, available from Mitsubishi). The results are show in FIG. 3.

Figure 3:
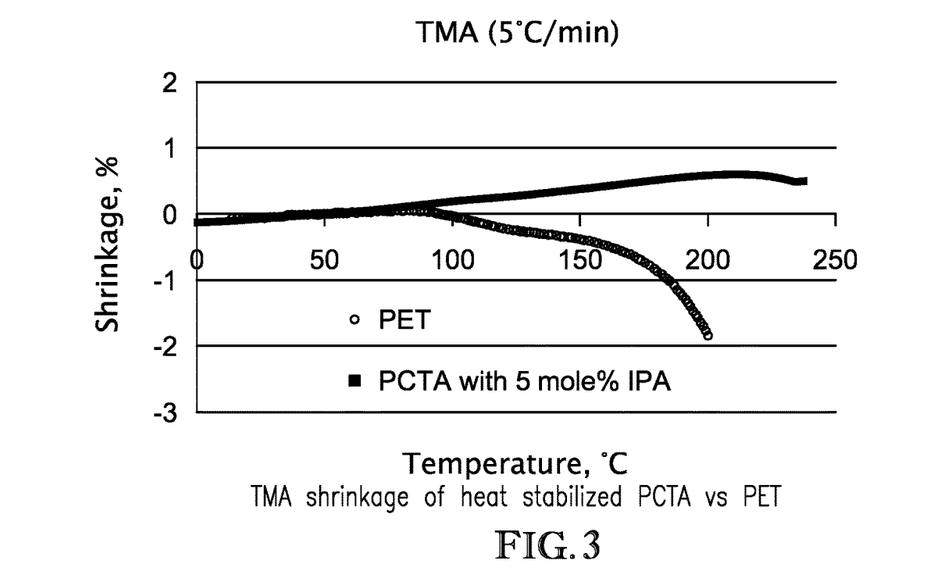
FIG. 3 is a graph showing the effect of temperature on percent shrinkage for PCTA and PET films.

A review of FIG. 3 shows that a typical 1 mil PET will have 0.5% shrinkage at 150° C., while 1 mil heat stabilized PCTA demonstrates no shrinkage, but thermal expansion due to heat. Based on these results, it is believed that films made from the PCTA blends (Examples 2-5) will also have less shrinkage compared to PET film.

Comparative Examples 9 and 10, and Example 11

Indium Oxide (InOx) sputtering was performed on PET and PCTA films. Comparative Example 9 is commercially available 2 mil PET film (Teijin DuPont OX50 PET, available from Teijin DuPont Films). Comparative Example 10 film was made from PCTA (Comp EX 2). Example 11 was a blend of 75 wt % PCTA 1 and 25 wt % PCTA 2, with the blend having a net IPA residuals content of approximately 10.25 mole %, based on the diacid residuals. Both Comp EX 10 and EX 11 films were produced with a Killion extruder using 1.5" OD screw into 20 mil sheet. The sheet was then cut into 4"×4" samples and biaxially stretched with a Brueckner Karo IV film stretcher. The stretching ratios were 3.2×3.2 (MD×TD). The stretching temperature was 110° C. and strain rate was 100%. The stretched sample was then annealed in a separate oven in the same film stretcher at 260° C. for 30 seconds. PET film was in roll form and coated directly in the vacuum chamber of a commercial continuous sputtering line. However, the cut PCTA samples were spliced to 3 mil commercial polyimide film, both leading and trailing edges, and coated in the vacuum chamber of the commercial continuous sputtering line.

The sputtering run conditions were as follows: InOx target, Ar=20 sccm, O2=75 sccm, line-speed=7 mm/sec. Base pressure during deposition=2.0e-4 torr. The mass flow unit sccm stands for standard cubic centimeter per minute at 0° C. and 1 atm. The results are shown in Table 5.

TABLE 5

Indium Oxide Sputtering Results

| Sample | Film Speed mm/sec | Sputtering Power kW | InOx Coating thickness nm | DDR Dynamic Deposit Rate nm × m/min |
|---|---|---|---|---|
| Comp EX 9 PET (2 mil) | 7 | 4 (max) | 40 | 16.8 |
| Comp EX 10 PCTA (2 mil) | 7 | 6 | 60 | 25.2 |
| EX 11 PCTA (2 mil) | 7 | 6 | 60 | 25.2 |

Comp EX 9 film started to show heat distortion above 4 kw. Therefore, 4 kw was the maximum power used for the 2 mil PET. There were no signs of heat distortion during deposition on the PCTA samples (Comp EX 10 and EX 11) using 6 kw sputtering power, showing that both PCTA samples can withstand greater than 50% (from 4 kw to 6 kw) more power than PET in sputtering. It also translated to 50% more thickness and DDR for the PCTA substrates with higher power. Alternatively, these results reveal that PCTA can run 50% faster in line speed to obtain the same coating thickness at higher power than PET, which needs to run at lower power and lower line speed.

Examples 13-16

The ability to process PCTA and PCTA blends in an extruder was evaluated. In extrusion, torque is the force applied to turn the screw. It is directly related to the motor load (or amps), which in turn is related to the melt viscosity of the polymer in the barrel. A Killion extruder with a 1.5" OD & L/D=24 screw was used for the extrusion comparison for different blends at three extrusion temperatures 580° F. (304° C.), 560° F. (293° C.), and 540° F. (282° C.), respectively, at a fixed screw speed of 73 rpm. Unmelt (polymer material that did not melt) became a problem in the extruded sheet if extrusion temperature drops below 540° F. Comparative Example 13 and Examples 14-16 were prepared by using/blending different proportions of PCTA 1 and PCTA 2. The blend ratios and net IPA mole % for each blend are as shown in Table 6.

TABLE 6

Blend ratios and net IPA mole % for each blend.

|  | Comp EX 13 | EX 14 | EX 15 | EX 16 |
|---|---|---|---|---|
| PCTA 1 | 100% | 80% | 75% | 70% |
| PCTA 2 | 0 | 20% | 25% | 30% |
| Net I PA mole % | 5 | 9.2 | 10.25 | 11.3 |
| Resin IV | 0.96 | 0.92 | 0.91 | 0.90 |

To maintain good mechanical properties of extruded polymeric film, the extrusion temperature is preferred to be as low as possible as long as no unmelt in the extruded film. However, low extrusion temperature in general results in high melt viscosity (motor load) which may damage the filtration components typically used for extruding optical film. The motor load as a function of temperature for each Example is shown in FIG. 4.

Figure 4:
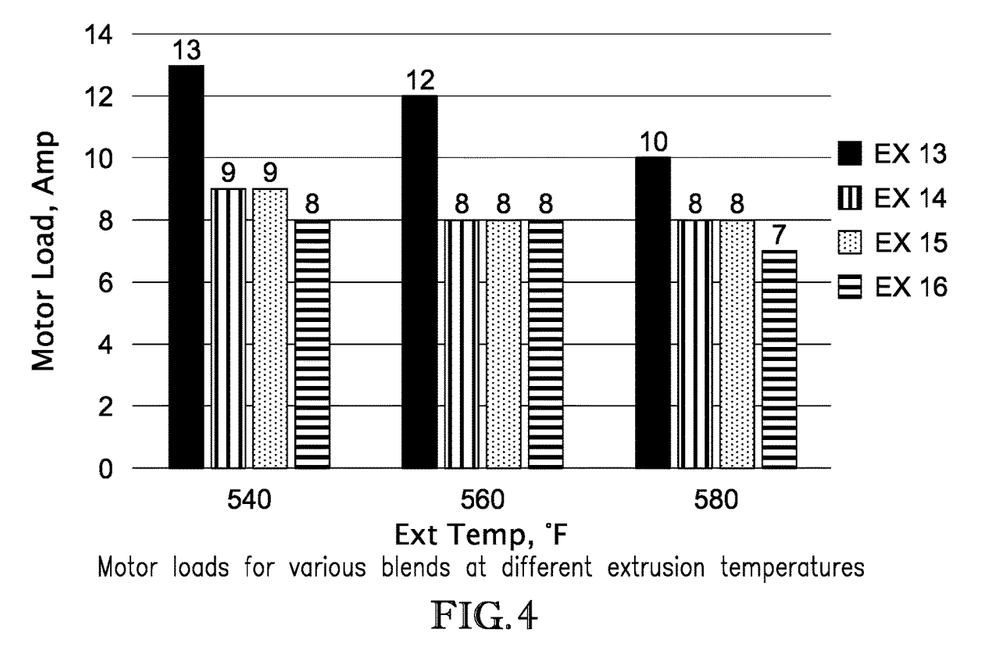
FIG. 4 is a graph showing the effect of extrusion temperature on motor load for different PCTA polymers/blends.

A review of FIG. 4 shows that Comp EX 13 was extruded at 580° F. (304° C.) with a motor load of 10 amps. When the extrusion temperature was reduced to 560° F., the motor load increased to 12 amps, which was deemed to be too high for an optical film extrusion. Further, when the extrusion temperature was reduced to 540° F., the motor load increased even more, to 13 amps.

In contrast, EXs 14-16 were extruded at 580° F. (304° C.), 560° F. (293° C.), and even 540° F. (282° C.), to produce films with good film quality and lower than 10 amps in motor load. Lower motor loads for the blends, which translates into reduced melt viscosity at lower melt process temperature, was unexpected. Since IV degradation is a function of temperature and dwell time in an extruder, lower extrusion temperature and melt viscosity translates to higher film IV with the same screw speed or dwell time. As higher IV for the film is equivalent to high molecular weight, being able to operate at lower extruder temperatures will result in greater mechanical properties of the extruded polymeric film.

Intrinsic viscosity (IV) degradation of polyester is a function of melt temperature and residence time in the extruder. The degradation of PCT polyester has been modeled using empirical data according to the following formula (I):

$$\frac{1}{IV^{1.37}} - \frac{1}{IV_0^{1.37}} = \frac{k}{2(4.98*10^{-4})^{1.37}}t \quad (I)$$

where IV is the intrinsic viscosity of the PCT polymer after extrusion, $IV_0$ is the initial intrinsic viscosity of the PCT polymer before extrusion, t is the residence time in the extruder in minutes, k is a constant determined by the following formula (II), $$k = \exp\left(21.373 - \frac{19500}{T}\right) \quad (II)$$

where T is the extrusion temperature in ° K (D R Gregory, M T Watson, Pol Eng Sci. v 12, no. 6, pp 454-458, 1972).

Figure 5:
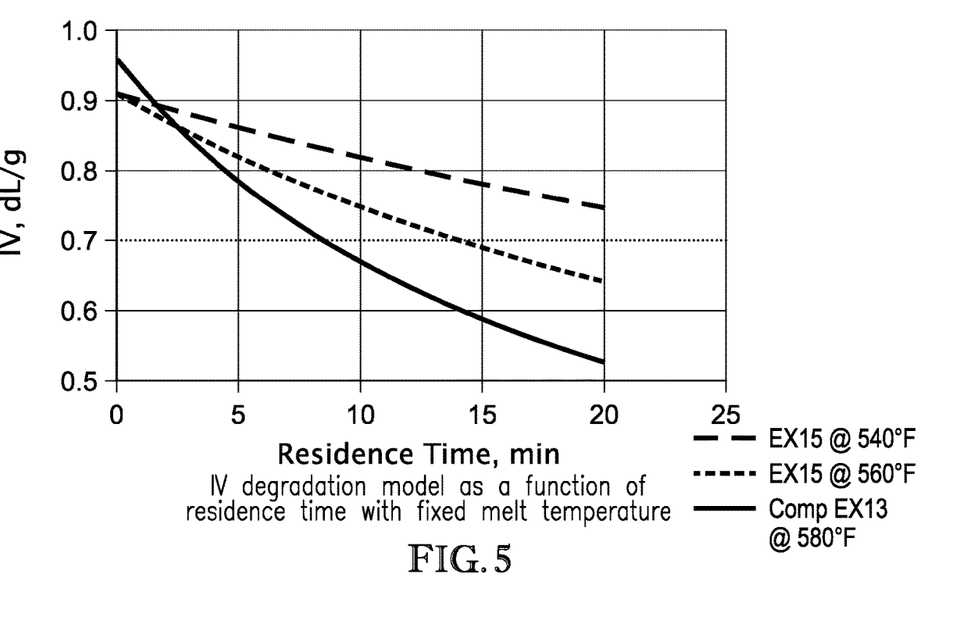
FIG. 5 is a graph showing a predictive model for the effect of temperature and extruder residence time on IV degradation for different PCTA polymers/blends.

Residence time for optical film extrusion is typically more than 10 minutes in an extruder. FIG. 5 shows a model prediction for IV degradation as a function of residence time (based on the above empirical formula for PCT polyester) for Comp EX 13, for an extrusion temperature of 580° F. (304° C.), and for EX 15, for an extrusion temperature of 540° F. (282° C.) and 560° F. (293° C.), respectively. As discussed above, Comp EX 13 could not be run at lower temperatures because of high extruder motor load. To maintain good mechanical properties of extruded film, the film IV needs to be at least 0.7 or higher. If the film has an IV below 0.7, it typically becomes too brittle. Based on FIG. 5, it would be difficult for Comp EX 13, with higher initial resin IV, to achieve 0.7 film IV with a residence time longer than 10 min at 580° F. (304° C.) melt temperature. In contrast, even though EX 15 has a lower initial resin IV, a film IV of 0.7 should be achievable for residence times up to about 15 minutes at 560° F. (293° C.) melt temperature. Further, the film IV for EX 15 is shown to be above 0.7 for residence times longer than 20 minutes at 540° F. (282° C.). The blends according to the present invention provide unexpected benefits of lowering motor load at lower melt temperature, and, based on an empirical formula (for PCT), it is believed that the blends will be able to maintain an acceptable film IV (e.g., above 0.7) for long residence times.

Comparative Example 17

ITO PCAP film was produced using a commercially available 2 mil PET film. The PET film was coated with ITO to form PCAP film using the conditions shown in Table 7. The mass flow unit sccm stands for standard cubic centimeter per minute at 0° C. and 1 atm.

TABLE 7

| PCAP ITO sputtering conditions | | | | | |
|---|---|---|---|---|---|
| | Speed m/min | Target 1 $O_2$ Sccm | Target 2 $O_2$ Sccm | Target 1 Power (90/10) kW | Target 2 Power (95/05) kW |
| Comp EX 17 (2 mil PET) | 2.75 | 15 | 30 | 10.0 | 4.4 |

The coated PCAP ITO film was annealed at different temperature and times and the sheet resistance was measured. The results are shown in Table 8 below.

TABLE 8

| Comp EX 17 Sheet resistance of PCAP ITO PET Film after annealing | | | |
|---|---|---|---|
| Annealing time, min | Annealed at 140° C. | Annealed at 150° C. | Annealed at 160° C. |
| 0 | 368 | 348 | 385 |
| 30 | 276 | 230 | 155 |
| 60 | 242 | 168 | 135 |
| 90 | 174 | 154 | ITO cracking due to film shrinkage |
| 120 | 142 | 148 | ITO cracking due to film shrinkage |

The as coated ITO PCAP film did not have low enough sheet resistance prior to being annealed at 150° C. for 60 min. A review of FIG. 3 reveals that PET film can shrink at 150° C. and curling may develop during annealing of ITO film. Table 8 shows that, to achieve low sheet resistance, higher annealing temperature is desired, provided that no curling or ITO cracking occurs. PCTA, having better heat resistance and dimensional stability, should perform better than PET as indicated in FIG. 3. It is believed that the PCTA blends according to the invention will provide a benefit of shorter annealing or even lower film resistance at higher annealing temperature, as illustrated by Table 8, without curling or ITO cracking. In addition, FIG. 2 shows that no significant haze developed during annealing of PCTA films according to the invention.

The invention has been described in detail with particular reference to preferred embodiments thereof, but it will be understood that variations and modifications can be effected within the spirit and scope of the invention.

I claim:

1. A polymer composition comprising a blend of a first PCTA copolyester and a second PCTA copolyester,
    said first PCTA copolyester comprising:
    (a) diacid residues comprising from about 90 to about 99 mole percent of terephthalic acid (TPA) residues and from about 1 to about 10 mole percent isophthalic acid (IPA) residues; and
    (b) diol residues comprising at least 85 mole percent of 1,4-cyclohexanedimethanol (CHDM) residues, wherein the first PCTA copolyester comprises a total of 100 mole percent diacid residues and a total of 100 mole percent diol residues;
    said second PCTA copolyester comprising:
    (a) diacid residues comprising from 70 to 80 mole percent of TPA residues and from 20 to 30 mole percent IPA residues; and
    (b) diol residues of 100 mole percent of CHDM residues, wherein the second PCTA copolyester comprises a total of 100 mole percent diacid residues and a total of 100 mole percent diol residues;
    wherein the first PCTA copolyester is semi-crystalline;
    wherein the second PCTA copolyester is amorphous; and
    wherein the blend comprises diacid residues comprising from about 5 to about 20 net mole percent of IPA residues, wherein the blend comprises a total of 100 mole percent diacid residues and a total of 100 mole percent diol residues.

2. The polymer composition according to claim 1, wherein the first PCTA copolyester comprises diacid residues comprising from 3 to 7 mole percent IPA residues.

3. The polymer composition according to claim 1, wherein the first PCTA copolyester and second PCTA copolyester each comprise diol residues comprising 100 mole percent CHDM residues.

4. The polymer composition according to claim 1, wherein the first PCTA copolyester has a degree of crystallinity of about 40% or greater.

5. The polymer composition according to claim 1, wherein the second PCTA copolyester is capable of being crystallized by heating or stretching.

6. The polymer composition according to claim 1, wherein the blend comprises diacid residues comprising from about 7 to about 12 net mole percent of IPA residues, wherein the blend comprises a total of 100 mole percent diacid residues and a total of 100 mole percent diol residues.

7. The polymer composition according to claim 1, wherein the blend comprises the first PCTA polyester in an amount from about 70 to about 80 wt % and the second PCTA polyester in an amount from about 20 to about 30 wt %.

8. The polymer composition according to claim 1, wherein the blend comprises less than 2 wt % of any additional additives.

9. The polymer composition according to claim 1, wherein the blend has a $T_g$ of at least 85° C., and a $T_m$ of at least 255° C.

10. A polyester film comprising a melt formed polyester blend, wherein said polyester blend comprises a first PCTA copolyester and a second PCTA copolyester,
    said first PCTA copolyester comprising:
    (a) diacid residues comprising from about 90 to about 99 mole percent of terephthalic acid (TPA) residues and from about 1 to about 10 mole percent isophthalic acid (IPA) residues; and
    (b) diol residues of 100 mole percent of 1,4-cyclohexanedimethanol (CHDM) residues, wherein the first PCTA copolyester comprises a total of 100 mole percent diacid residues and a total of 100 mole percent diol residues;
    said second PCTA copolyester comprising:
    (a) diacid residues comprising from 70 to 80 mole percent of TPA residues and from 20 to 30 mole percent IPA residues; and
    (b) diol residues of 100 mole percent of CHDM residues, wherein the second PCTA copolyester comprises a total of 100 mole percent diacid residues and a total of 100 mole percent diol residues;
    wherein the first PCTA copolyester is semi-crystalline;
    wherein the second PCTA copolyester is amorphous;
    wherein said blend comprises diacid residues comprising from about 5 to about 20 net mole percent of IPA residues, wherein the blend comprises a total of 100 mole percent diacid residues and a total of 100 mole percent diol residues; and
    wherein the film has a thickness in the range from about 25 to about 250 microns.

11. The polyester film according to claim 10, wherein the film has an IV greater than 0.7 dL/g.

12. The polyester film according to claim 10, wherein said polyester film is biaxially oriented and has a haze of less than 1%.

13. The polyester film according to claim 12, wherein the polyester film is capable of being annealed at a temperature of 150° C. for 90 minutes and maintaining a haze of less than 1%.

14. The polyester film according to claim 10, further comprising an ITO coating and having a sheet resistance of less than about 100Ω/□.

15. A method of making a biaxially oriented polyester film, said method comprising blending a first PCTA copolyester and a second PCTA copolyester; forming a melt processable polymer composition from the blend; melt forming the melt processable polymer composition to form a sheet; and biaxially stretching the sheet to form a film, wherein said polyester blend comprises a first PCTA copolyester and a second PCTA copolyester,
    said first PCTA copolyester comprising:
    (a) diacid residues comprising from about 90 to about 99 mole percent of terephthalic acid (TPA) residues and from about 1 to about 10 mole percent isophthalic acid (IPA) residues; and
    (b) diol residues comprising at least 85 mole percent of 1,4-cyclohexanedimethanol (CHDM) residues, wherein the first PCTA copolyester comprises a total of 100 mole percent diacid residues and a total of 100 mole percent diol residues;
    said second PCTA copolyester comprising:
    (a) diacid residues comprising from 70 to 80 mole percent of TPA residues and from 20 to 30 mole percent IPA residues; and
    (b) diol residues of 100 mole percent of CHDM residues, wherein the second PCTA copolyester comprises a total of 100 mole percent diacid residues and a total of 100 mole percent diol residues;
    wherein the first PCTA copolyester is semi-crystalline;
    wherein the second PCTA copolyester is amorphous;
    wherein said blend comprises diacid residues comprising from about 5 to about 20 net mole percent of IPA residues, wherein the blend comprises a total of 100 mole percent diacid residues and a total of 100 mole percent diol residues.

16. The method according to claim 15, wherein the blend comprises diacid residues comprising from about 7 to about 12 net mole percent of IPA residues, wherein the blend comprises a total of 100 mole percent diacid residues and a total of 100 mole percent diol residues.

17. The method according to claim 15, wherein the melt forming step comprises extruding the blend at a temperature at or below 580° F. (304° C.) using an extruder, and wherein the motor load on the extruder is lower for the blend compared to extruding only the first PCTA polymer under similar conditions.

18. The method according to claim 15, wherein the polyester film has a haze of less than 1%.

19. The method according to claim 18, wherein the polyester film is capable of being annealed at a temperature of 150° C. for 90 minutes and maintaining a haze of less than 1%.

* * * * *